United States Patent [19]

Lambert

[11] 4,368,832
[45] Jan. 18, 1983

[54] FLUID DISPENSING VALVE HAVING A DEFORMABLE DIAPHRAGM

[76] Inventor: Louis J. Lambert, 96 Sutherland Rd., Beecroft, New South Wales, 2119, Australia

[21] Appl. No.: 170,163

[22] Filed: Jul. 18, 1980

[30] Foreign Application Priority Data

Jul. 30, 1979 [AU] Australia .................. PD9778

[51] Int. Cl.³ .................................. B67D 3/00
[52] U.S. Cl. .................... 222/509; 222/514; 251/251
[58] Field of Search ........... 222/505, 509, 514, 518, 222/559; 251/228, 251

[56] References Cited

U.S. PATENT DOCUMENTS

| | | | |
|---|---|---|---|
| 3,091,374 | 5/1963 | Schwartzman | 222/518 X |
| 3,356,267 | 12/1967 | Scholle | 222/509 X |
| 3,542,257 | 11/1970 | Parish | 222/509 |
| 4,179,052 | 12/1979 | Abbott | 222/509 |

FOREIGN PATENT DOCUMENTS

| | | | |
|---|---|---|---|
| 36368 | 8/1926 | Denmark | 222/514 |
| 453230 | 10/1925 | Fed. Rep. of Germany | 222/509 |
| 2457786 | 6/1976 | Fed. Rep. of Germany | 222/505 |
| 1367605 | 6/1964 | France | 222/505 |

*Primary Examiner*—Howard N. Goldberg
*Assistant Examiner*—Fred A. Silverberg
*Attorney, Agent, or Firm*—Stevens, Davis, Miller & Mosher

[57] ABSTRACT

A fluid dispensing valve having a casing with a conduit therethrough with a valve seat at one end. A valve element on a deformable resilient diaphragm seals the valve seat when closed. A lever or arm is used to displace the valve element, against the biasing force of the diaphragm to allow fluid flow.

1 Claim, 18 Drawing Figures

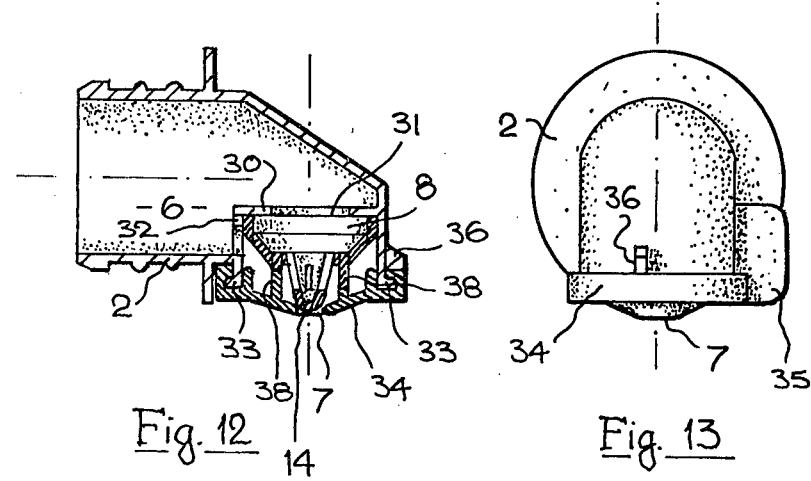
Fig. 12  Fig. 13
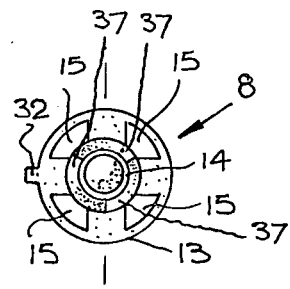 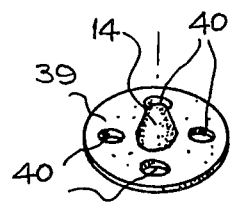
Fig. 14  Fig. 16
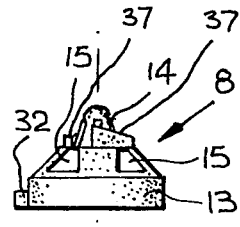 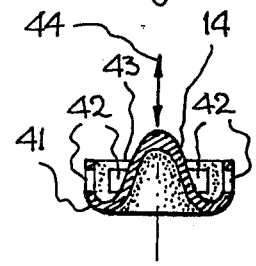
Fig. 15  Fig. 17
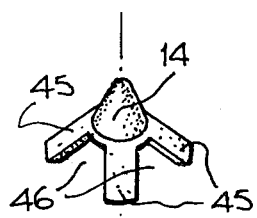
Fig. 18

FLUID DISPENSING VALVE HAVING A DEFORMABLE DIAPHRAGM

BACKGROUND OF THE INVENTION

This invention relates to fluid dispensing valves, and more particularly to such valves which do not require to be used over the extended period for which metal valves in engineering applications are designed. A major application of the present invention is envisaged as a dispensing valve for packages containing fluids.

Valves of the above-mentioned kind are often provided on collapsible plastics or laminated metal foil/plastics containers such as the inner pouches of the "wine casks" which are proving popular in this country. However, other kinds of container are also contemplated as being suitable for the fitting thereto of fluid dispensing valves according to the present invention.

DESCRIPTION OF THE PRIOR ART

One kind of prior art valve for such use has a pointed spigot which is required to be thrust through a bursting disc device provided in a collapsible inner container or pouch. It has a rotatable tap which operates on a simple gate valve principle and is made of a hard plastics material.

Another kind has an interior diaphragm provided with a slit which gapes when a small lug or tongue is pressed upwardly with the finger.

These and other prior art valves have posed problems in the quality control of their liquid sealing properties, and in the control of their liquid efflux rate and efflux direction. The physical effort involved in manual activation and adjustment of liquid efflux is markedly variable and unpredictable in prior art valves currently widely in use in this country.

Moreover, the two commonest valve types—as briefly described above—necessitate the employment of certain specific plastics materials to enable operation of the valve closure. These materials do not possess good oxygen barrier properties, and this lack is a serious disadvantage in their use as wine-dispensing valves as the shelf-life of the packaged wine may well be drastically shortened.

When the art of packaging liquids such as wines was in its infancy the plastics material used to manufacture the inner, collapsible pouches generally exhibited poor oxygen barrier properties and this proved to be the weak point. However, the advent of the laminated metal foil pouch overcame this particular drawback and the material of the dispensing valve now became the weak point of the product.

SUMMARY OF THE INVENTION

It is therefore an object of the present invention to overcome the above and other disadvantages by the provision of a fluid dispensing valve comprising a valve casing either receivable within an outlet socket of a container for fluid, or attached directly to said container, said valve casing defining a conduit one end of which is in communication with the interior of said container and the other end of which is in communication with an aperture constituting a valve seat; a deformable, resilient diaphragm accommodated within said conduit and having a centrally-disposed valve element thereon which is in sealing engagement with the said valve seat when the valve is in the closed position, said diaphragm being provided with at least one opening therein; and means operable for displacing said valve element from said valve seat, against the biasing force of said resilient diaphragm, to thereby allow fluid to flow from the interior of said container into said conduit, through said at least one opening and out through said valve seat for discharge therefrom.

BRIEF DESCRIPTION OF THE DRAWINGS

In order that the reader may gain a better understanding of the present invention, hereinafter will be described certain embodiments thereof, by way of example only and with reference to the accompanying drawings in which:

FIG. 12 shows a cross-section of a fifth embodiment;

FIG. 13 is a corresponding front view;

FIG. 14 is a plan view of the resilient diaphragm of the embodiment shown in FIG. 12;

FIG. 15 is a side elevation corresponding to FIG. 14;

FIG. 16 is a perspective view of a modified diaphragm;

FIG. 17 is a cross-section of a further modification of a diaphragm; and

FIG. 18 is a perspective view of yet another suitable diaphragm.

DESCRIPTION OF THE PREFERRED EMBODIMENTS

Figure 1:
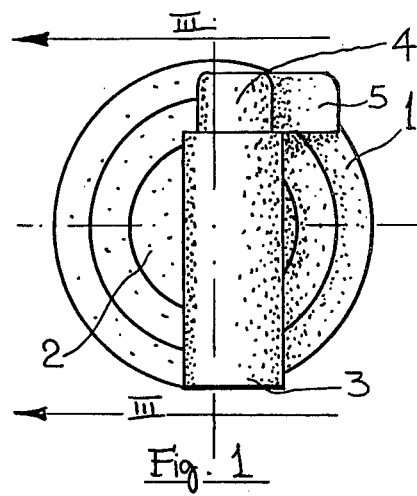
FIG. 1 is a front elevation of a first embodiment of a fluid dispensing valve according to the present invention.
Figure 2:
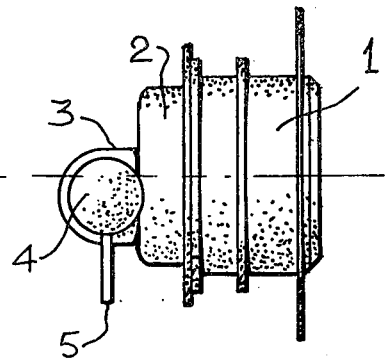
FIG. 2 is a corresponding plan view.
Figure 4:
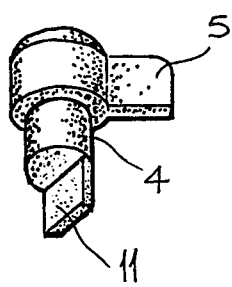
FIG. 4 is a perspective view of a spigot showing the tongue.

FIGS. 1 and 2 show, respectively, front and plan views of the valve according to a first embodiment of the present invention. In these Figures reference numeral 1 indicated an outlet socket of a typical container for fluids which may be a collapsible pouch. Into socket 1 is fitted a valve casing 2. Associated with valve casing 2 is a cylindrical member 3 into the top of which is fitted a spigot 4 having a handle 5 for its manipulation; spigot 4 is shown rotated into the "off" position to close the assembly.

Figure 3:
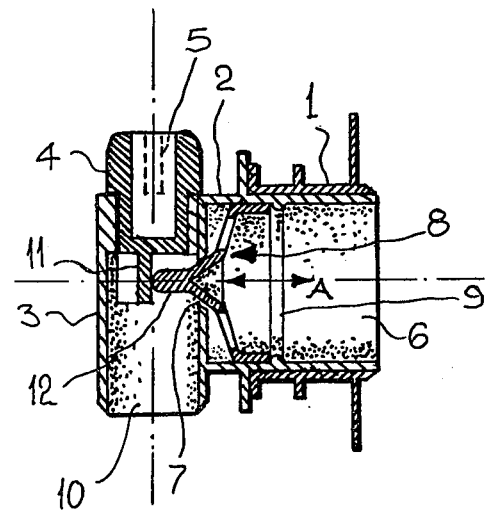
FIG. 3 is a cross-section on line III—III of FIG. 1.

FIG. 3 is a cross-section on line III—III of FIG. 1 and shows how valve casing 2 is received into socket 1 to define a conduit 6, the open end of which is in communication with the interior of the container to which socket 1 may be fitted. However, it will be realised that valve casing 2 may just as well be attached directly to the container. At the other end of valve casing 2 is an aperture 7 (better to be seen in FIG. 6) which constitutes a valve seat. Accommodated within conduit 6 defined by valve casing 2 there is a deformable, resilient diaphragm generally indicated by reference numeral 8 and maintained in position by an inner bead or shoulder 9. Diaphragm 8 will be fully described hereinafter with reference to FIGS. 5 and 6, and sufficient now it is to state that diaphragm 8 has a centrally-disposed valve element adapted to sealingly engage with valve seat aperture 7 when the valve is in the closed position as shown.

The hollow, generally cylindrical member 3 is in communication with conduit 6 via valve seat aperture 7 and its lower end forms a discharge nozzle 10. Spigot 4 fits rotatably into the upper end of member 3 and its lower end, accommodated within member 3, terminates in a tongue 11. Thus, when spigot 4 is rotated, by manipulation of handle 5, from the closed to the open position, tongue 11 pushes against a projecting boss 12 integral with the central valve element on diaphragm 8, displacing the said valve element from valve seat 7 to allow fluid to flow from the interior of the container into conduit 6, through openings in diaphragm 8 and out through valve seat aperture 7 for delivery through nozzle 10. When spigot 4 is rotated in the opposite direction, that is to say, from the open to the closed position, the resilience inherent in diaphragm 8, aided by the fluid pressure behind the valve, restores the status quo and once again seals valve seat 7 against fluid flow therethrough.

Figure 5:
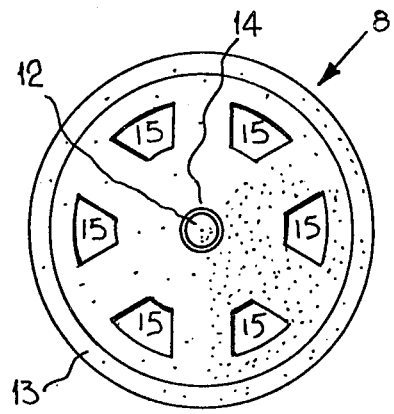
FIG. 5 is a plan view of a typical resilient diaphragm.
Figure 6:
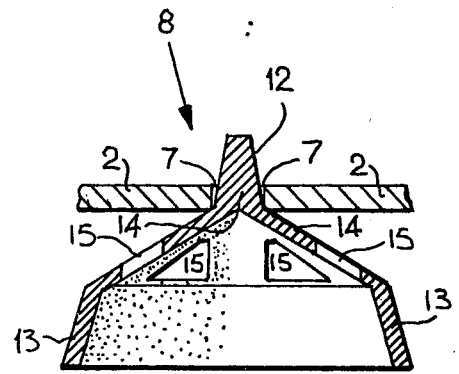
FIG. 6 is a corresponding radial section.

As will now have been appreciated, a very valuable feature of the present invention is the diaphragm, one embodiment of which is best to be seen in FIGS. 5 and 6.

FIG. 5 is a plan view of such a diaphragm 8, and FIG. 6 is a corresponding radial cross-section. Diaphragm 8 is substantially conical in shape and has an annular skirt 13 about its base. The apex portion includes a valve element 14 which is adapted to be biased, by the inherent resiliency of the diaphragm, into sealing engagement with valve seat 7 constituted by the previously-noted aperture in an end of valve casing 2. Valve element 14 terminates in the projecting boss 12 but it should be understood that various modifications in the geometry of diaphragm 8 can be tolerated, as will later be seen herein.

Diaphragm 8 has at least one opening, such as the openings 15, spaced about its conical portion, to permit fluid flow between the container and the valve seat end of valve casing 2.

When diaphragm 8 is fitted into valve casing 2, skirt 13 centres the valve element 14 with respect to the valve seat aperture 7. When pressure is applied to the tip of boss 12, the conical portion will flex or bend so as to disengage valve element 14 from valve seat 7 to permit fluid flow therethrough.

Figure 7:
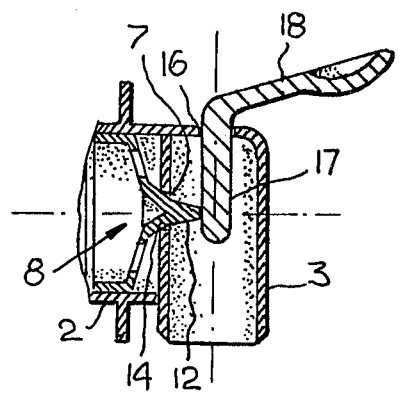
FIG. 7 is a cross-section similar to that of FIG. 3 but of a second embodiment.

FIG. 7 is a cross-section, similar to that shown in FIG. 3, but of a second embodiment of the present invention. In this Figure the outlet socket is not shown and the diaphragm is shown fragmentarily. In this embodiment, member 3 does not accommodate a spigot but, instead, has a slot 16 in its upper end. Through slot 16 is forced the 'reactive' limb 17 of an angled lever. The periphery of slot 16 constitutes a fulcrum so that when the 'active' limb 18 is pressed downwardly, as by finger pressure, the end of limb 17 exerts the required pressure on boss 12 so as to displace valve element 14 of diaphragm 8 from valve seat 7 in the end of casing 2.

Figure 8:
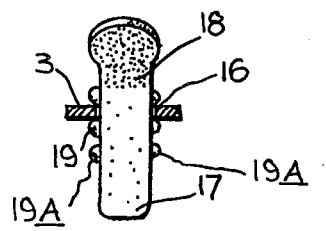
FIG. 8 shows a minor modification of the lever of FIG. 7.

In a minor modification shown in FIG. 8, the angled lever is conveniently removed for transport or when the fluid container is not in use and, when it is desired to dispense fluid from the container, lower limb 17 is thrust into slot 16 until it 'clicks into place' by virtue of the top member 3 becoming lodged between the two pairs of proturberances 19 on limb 17. Further, the angled lever may be safeguarded from accidental actuation by its being pulled out of engagement with member 3 via protuberances 19 and again 'clicked into place', but this time by virtue of top member 3 becoming lodged between the lower pair of protuberances 19 and another pair 19A. This lodges the angled lever higher up in the slot 16 so that the lower limb 18 will no longer reach down far enough to contact boss 12.

Figure 9:
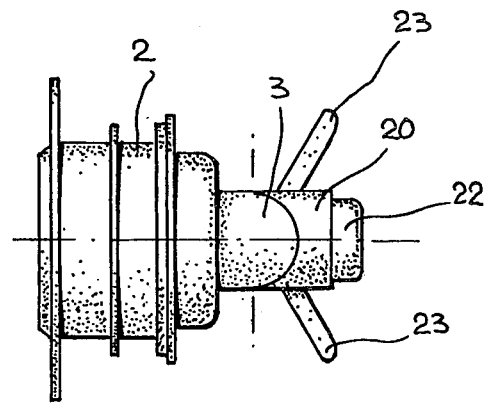
FIGS. 9 and 10 show a third embodiment.
Figure 10:
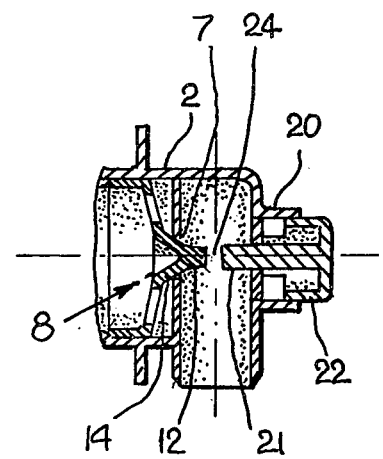

FIGS. 9 and 10 illustrate a third embodiment which has what may be termed a 'push-button' action. Here, member 3 has a sleeve 20 through which extends a push-rod or piston 21. Piston 21 is actuated by a resilient, deformable button 22. This embodiment may be operated by hooking two fingers behind the two lateral ears or lugs 23, and pushing button 22 in with the thumb so that it deforms to move piston 21 through sleeve 20 to thus exert the required pressure on boss 12 to cause valve element 14 to be lifted off valve seat 7. When the valve of this embodiment is in the closed position there should preferably be a gap 24 between the inner end of piston 21 and boss 12 as, since the opening action is a direct thrust, this embodiment is more susceptible to accidental actuation than are the previously described embodiments.

Figure 11:
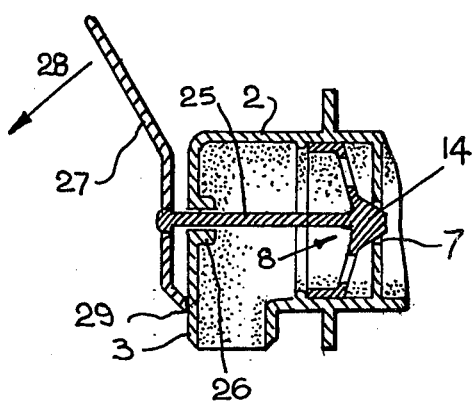
FIG. 11 illustrates a fourth embodiment.

FIG. 11 shows a fourth embodiment in which the valve element 14 is reversed relative to the arrangements shown in FIGS. 3, 7 and 10. Here, valve element 14 is displaced from valve seat 7 by an actuating rod 25 which extends through a gland 26. To the outer end of rod 25 is attached a lever 27 which, when it is depressed in the direction of arrow 28, fulcrums at 29 to thus unseat valve element 14. When lever 27 is released, diaphragm 8 returns valve element 14 to valve seat 7 in sealing arrangement.

FIGS. 12 to 15 show a fifth embodiment of the present invention, and one which is particularly suitable for the dispensing of wine, since it does not possess a nozzle. FIGS. 12 and 13 are, respectively, a cross-section and a front view of this last embodiment. Here, the diaphragm 8—to be fully described hereinafter with reference to FIGS. 14 and 15—is disposed in a plane normal to the longitudinal axis of conduit 6. Diaphragm 8 is held within conduit 6 by an integral seating arrangement 30, an opening 31 in which places the interior of the container in communication with diaphragm 8. To prevent diaphragm 8 from rotating in its seat 30, a small lug 32 may be provided, which lug is able to be lodged in a corresponding recess in seat 30.

Push-fitted into engagement with an outlet port 33 of valve casing 2, and rotatable with respect thereto, is a cap member 34 which has a central valve seat aperture, as before, referenced 7. Cap member 34 has a handle 35 by which it may be rotated, and a detent 36 is provided on valve casing 2 to prevent cap member 34 from being turned too far.

Turning now to the matter of diaphragm 8, this is generally similar to that illustrated in the previous drawings, and has an annular skirt 13, openings 15 and a valve element portion 14 just as before, as is to be seen in FIGS. 14 and 15.

Diaphragm 8 also has, surrounding valve element 14, a number of annular, inclined camming surfaces 37, in this instance three such, equidistantly spaced about the central protuberance. Co-operating and co-acting with camming surfaces 37 are an equal number of similarly shaped annular, inclined camming surfaces 38 arranged about valve seat 7 of cap member 34.

When cap member 34 is in the closed position, camming surfaces 37 on diaphragm 8 and those camming surfaces 38 on cap 34 are not in engagement with each other so that valve element 14 is sealingly seated in valve seat 7. When cap member 34 is rotated by manipulation of its handle 35, the camming surfaces 37, 38 slide with respect to each other so that openings are formed between 37 and 38, and at the same time valve element 14 of diaphragm 8 is lifted from valve seat 7 in cap 34, against the biasing force inherent in the deformable, resilient diaphragm 8. Fluid may now flow from the container into conduit 6, then via opening 31, openings 15 in diaphragm 8, the gaps formed by the sliding together of camming surfaces 37 and 38, and out through the valve seat aperture 7 for delivery.

As will be realized, it is not essential that the diaphragm should, in all applications, be conical in shape, have an annular skirt, possess a distinct boss extending from the apex of the valve element and be provided with discrete openings in the conical part. Some modified diaphragms are shown in FIGS. 16, 17 and 18; FIG. 16, for example, illustrates a diaphragm having a disc-shaped, planar portion 39 with a number of openings 40 in it, and with the valve element 14 extending upwardly from the center of portion 39.

FIG. 17 is a cross-section through a diaphragm which is partly "turned inside-out" so to speak; this diaphragm has an annular skirt 41 provided with a number of openings 42. In this modification the diaphragm is held with the periphery 43 of skirt 41 against a suitable seating arrangement in a valve casing, the valve element 14 flexing and returning in the directions indicated by double-arrow 44 in response to the displacing means.

Finally, FIG. 18 shows a diaphragm which is generally conical but which has no skirt, instead being formed as a 'spider', the legs 45 acting as the flexing part of the diaphragm. The spaces 46 between legs 45, through which fluid flow takes place, act as do the openings in the previously-described diaphragms.

While the foregoing description has been wholly in terms of a deformable, resilient diaphragm having thereon a valve element and being provided with means whereby fluid may flow through the diaphragm—openings or spaces—and a rigid valve seat with its aperture, the reverse arrangement is nevertheless also contemplated. It is thus considered that an arrangement wherein the diaphragm with all its features is the rigid element, but the apertured valve seat is deformable and resilient, is within the spirit of the invention.

Valve element and valve seat may be separated by various displacement means such as external or internal screw arrangements; ramps, camming surfaces and inclined planes; pull- or push-rods; lever systems; rotating depressors and even squeeze-operated arrangements: some of these means have, of course, been previously described above.

The material or materials from which the components of the fluid valve are fabricated are determined by several criteria to be met, such as the product to be dispensed through the valve, approval for food usage, relative material costs, gas and/or other transmission barrier performance of the valve, mechanical properties for desired number of operations of the valve before disposal, price stability, ease of processing and the like.

One polymer suitable for the diaphragm is polyurethane, but other polymers of similar flexibility and rheology including ethylene vinyl acetate copolymers and modified blends thereof with materials of rubber type may be employed. Modified polypropylenes, polyethylenes, ethylene copolymers and polyamides may all be used, depending on the performance desired.

As opposed to the fluid dispensing valves which are currently in use, the inventive valves which have been described exhibit a number of distinct advantages including:
 (1) greater efficiency of operation;
 (2) simplicity of manipulation;
 (3) leak-free construction;
 (4) low cost;
 (5) suitability for mass-production by plastics injection moulding processes;
 (6) ease of assembly;
 (7) capability to be tested before assembly;
 (8) filling of container through valve possible; and
 (9) elimination of the need for the provision of a separate socket on the container.

From the abovegoing the reader will readily appreciate that fluid dispensing valves constructed according to the present invention provide the public with a new and much-improved article or, at the very least, offer to it a useful and attractive choice.

The claims defining the invention are as follows:

1. A liquid-dispensing diaphragm valve comprising a valve casing defining a conduit having an interior wall, one end of which is in communication with the interior of a container for liquid and the other end of which is in communication with an aperture constituting a valve seat; a deformable, resilient, substantially conical diaphragm having an apex and accommodated within said conduit and having, extending abouts its base, an annular skirt having means to prevent rotation thereof and which fits into said conduit so that said diaphragm is disposed in a plane normal to the longitudinal axis of said conduit and further having a boss-like valve element with its base on said apex and projecting axially therefrom, said valve element being adapted to sealingly engage with said valve seat when the valve is in the closed position, said diaphragm being provided with at least one opening therethrough immediately adjacent the base of the valve element; said valve seat being an aperture located centrally in a cap member disposed in a plane parallel to that of said diaphragm and rotatably engageable with an outlet port of said conduit, said diaphragm having at least two protuberances circumferentially spaced apart and projecting outwardly from said apex and parallel to said valve element but to a lesser axial extent than said valve element wherein said protuberances are radially spaced between the interior wall of the conduit and the valve element, said protuberances having at their distal ends camming surfaces, each having a tooth-like profile, the plane of each of said camming surfaces being at an acute angle to the axis of the valve element; said cap member having at least two circumferentially spaced apart annular, inclined, inwardly-directed camming surfaces surrounding said central aperture, radially spaced between the interior wall of the conduit and the valve element and co-acting with the camming surfaces of said diaphragm protuberances; the arrangement being such that rotation of said cap member causes the annular camming surfaces of the said cap member to slidably move over the co-acting camming surfaces of said diaphragm to thereby displace said valve element from said valve seat, against the biasing force of said resilient diaphragm, and thus to provide a number of openings defined between the circumferentially spaced apart co-acting camming surfaces; thereby allowing liquid to flow from the interior of said container into said conduit, through said at least one opening in said diaphragm, through the defined openings between caming surfaces and out through said valve seat for discharge therefrom.

* * * * *